US011395995B2

(12) United States Patent
Zuidema et al.

(10) Patent No.: US 11,395,995 B2
(45) Date of Patent: Jul. 26, 2022

(54) MIXING DEVICE, MIXING HOPPER AND DOSING CONTAINER

(71) Applicant: Casper Johan Zuidema, Enschede (NL)

(72) Inventors: Casper Johan Zuidema, Enschede (NL); Hette Zuidema, Enschede (NL)

(73) Assignee: Casper Johan Zuidema, Enschede (NL)

( * ) Notice: Subject to any disclaimer, the term of this patent is extended or adjusted under 35 U.S.C. 154(b) by 0 days.

(21) Appl. No.: 15/309,660

(22) PCT Filed: Nov. 12, 2015

(86) PCT No.: PCT/NL2015/050325
§ 371 (c)(1),
(2) Date: Nov. 8, 2016

(87) PCT Pub. No.: WO2015/170986
PCT Pub. Date: Nov. 12, 2015

(65) Prior Publication Data
US 2017/0173541 A1    Jun. 22, 2017

(30) Foreign Application Priority Data

May 8, 2014    (NL) ...................................... 2012786

(51) Int. Cl.
*B01F 7/00* (2006.01)
*B01F 27/271* (2022.01)
(Continued)

(52) U.S. Cl.
CPC .......... *B01F 27/2711* (2022.01); *B01F 23/69* (2022.01); *B01F 25/822* (2022.01);
(Continued)

(58) Field of Classification Search
CPC .. B01F 7/00758; B01F 7/00766; B01F 7/008; B01F 7/00808; B01F 3/188; B01F 5/244;
(Continued)

(56) References Cited

U.S. PATENT DOCUMENTS 1,925,541 A  *  9/1933  Noble .................... B28C 7/0069
                                                                          222/132
3,588,055 A     6/1971  Jong
(Continued)

FOREIGN PATENT DOCUMENTS

DE    2855751 A1    6/1980
DE    3413757 A1    10/1985
(Continued)

OTHER PUBLICATIONS

Krasenbrink, B, Examiner, International Search Report, dated Dec. 15, 2015.
(Continued)

*Primary Examiner* — Anshu Bhatia
(74) *Attorney, Agent, or Firm* — Perry + Currier Inc.

(57) ABSTRACT

Mixing device 1, dosing container and mixing hopper for mixing a synthetic starting material with an additive, in particular a granular additive or additive in powder form, comprising a mixing housing 10 with an inlet 14 for allowing the substances into a mixing chamber 12 bounded by the mixing housing and an outlet 16 for discharging the substances from the mixing chamber in mixed form, wherein a rotor body 11 is provided on a rotatable shaft 17 in the mixing chamber and comprises on a side a number of rotor arms 18 extending parallel to the shaft in the direction of an opposite wall of the mixing housing 10, and wherein the opposite wall of the mixing housing is provided with a number of stator arms 19 extending parallel to the shaft in the direction of the rotor body, and wherein a mixing hopper
(Continued)

Figure 1:
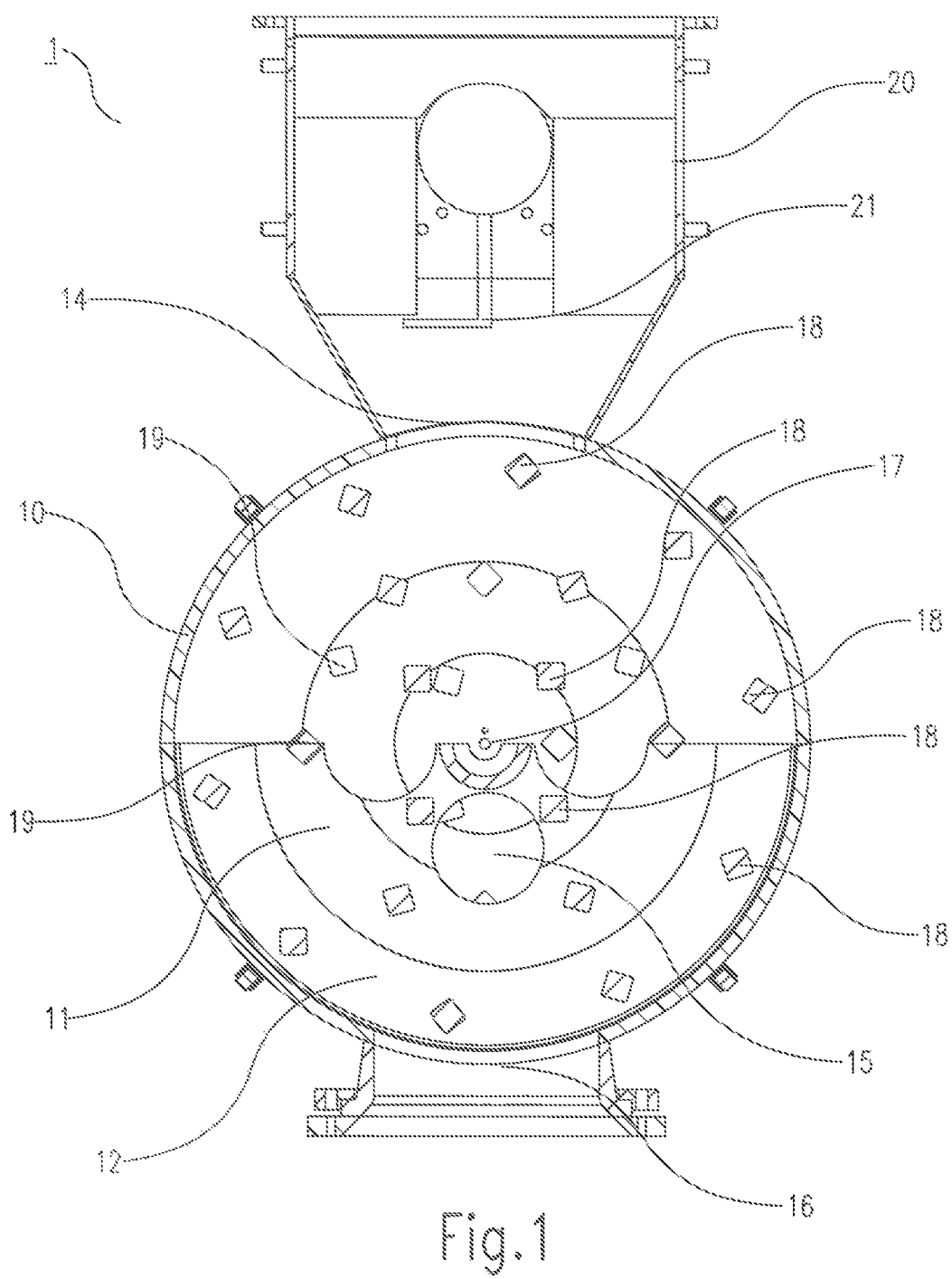

is provided having an infeed side for receiving a flow of the substances for mixing and an outfeed side which is in open communication with the inlet of the mixing housing 10, and wherein a dividing body is provided between the infeed side and outfeed side in order to divide the flow of the substances for mixing into a number of at least substantially equal part-flows.

18 Claims, 2 Drawing Sheets

(51) Int. Cl.
| | |
|---|---|
| *G01G 13/16* | (2006.01) |
| *B01F 23/60* | (2022.01) |
| *B01F 25/90* | (2022.01) |
| *B01F 25/82* | (2022.01) |
| *B01F 27/191* | (2022.01) |
| *B01F 35/00* | (2022.01) |
| *B01F 35/21* | (2022.01) |
| *B01F 25/00* | (2022.01) |
| *B01F 35/30* | (2022.01) |

(52) U.S. Cl.
CPC ............ *B01F 25/90* (2022.01); *B01F 27/191* (2022.01); *B01F 27/271* (2022.01); *B01F 35/187* (2022.01); *B01F 35/2117* (2022.01); *G01G 13/16* (2013.01); *B01F 2025/912* (2022.01); *B01F 2035/351* (2022.01)

(58) Field of Classification Search
CPC .. B01F 5/26; B01F 7/00633; B01F 15/00194; B01F 15/00974; B01F 2005/0008; B01F 2015/00084; G01G 13/16
USPC ................................ 366/9, 18, 306
See application file for complete search history.

(56) References Cited

U.S. PATENT DOCUMENTS

| | | | |
|---|---|---|---|
| 4,243,636 A * | 1/1981 | Shiraki | ............... B01F 3/04531 366/101 |
| 5,738,286 A | 4/1998 | Nishibori | |
| 5,785,259 A | 7/1998 | Nishibori | |
| 2013/0004247 A1 | 1/2013 | Reece et al. | |
| 2013/0258799 A1 * | 10/2013 | Christy | ............... B01F 15/0201 366/141 |

FOREIGN PATENT DOCUMENTS

| | | |
|---|---|---|
| DE | 293509 A5 | 5/1991 |
| EP | 0615781 A1 | 9/1994 |
| EP | 0892255 A1 | 1/1999 |
| FR | 323942 A | 3/1903 |
| GB | 110816 | 11/1917 |
| GB | 1080357 A | 8/1967 |
| GB | 1580507 A | 12/1980 |
| JP | 2007330944 | 12/2007 |
| RU | 198502788 A1 | 4/1985 |
| WO | 3502788 A1 | 7/1985 |
| WO | WO-2015170986 A3 | 11/2015 |

OTHER PUBLICATIONS

National Search Report with Citations dated Oct. 20, 2014 for corresponding Dutch Patent Application No. 2012786.
Information Disclosure Statement dated Nov. 8, 2016 for corresponding U.S. Appl. No. 15/309,660.
Process Group, "K-Tron Process Group—The Technology Leader for Process Feeding and Conveying Equipment" Flyer (with English translation), 2002.
VM Verlag, "INOEX—A New Face to Face the Future." Extrusion International Magazine, Apr. 2013, vol. 19, Koln, Germany, (with English translation).
Movacolor website and brochure, "Gravimetric and volumetric dosing machines for the plastics industries." MCWeight P, Aug. 4, 2012. Retrieved from the wayback machine, URL: https://web.archive.org/web/20130804080031/www.movacolor.com/products/gravimetric-dosing/mcweight-p.html.
Anlagenkonvolut—Anlagenbetellungen und Lieferungen; bis zum May 5, 2014, (System bundle—system orders and deliveries; until May 5, 2014) email from Christian Stutzinger (with English translation), Sep. 26, 2013.

* cited by examiner

MIXING DEVICE, MIXING HOPPER AND DOSING CONTAINER

The present invention relates in a first aspect to a dosing container for application in a mixing device for mixing a synthetic starting material with an additive, in particular for instance a granular additive or additive in powder form, which dosing container comprises a space bounded by a container wall for containing a supply of a substance for mixing and carrying a dosed quantity of the substance therefrom to a mixing housing of the mixing device, which space is in air-exchanging communication with an ambient air via an air filter, and wherein the dosing container is provided with measuring means which are able and configured to measure a weight change in the container.

A dosing container is often applied in a mixing device in order to contain a supply of one of a number of substances for mixing and to be able to draw therefrom in dosed manner a quantity of the substance required for a mixing process. A known dosing container comprises a space bounded by a container wall for containing a supply of substance. The container wall comprises a filling opening on an upper side to enable the space to be filled with a substance. On an opposite underside the container wall comprises a funnel-like bottom which narrows to a pouring opening at which a dosed quantity of the substance stored in the space can be released. The dosing container can in practice be in communication via for instance the pouring opening with a mixing hopper of the mixing device in order to supply a dosed quantity of the substance to the mixing hopper.

For a correct dosage of a quantity of the substance the known dosing container is provided with a set of load cells comprising a pressure or strain-sensitive sensor for the purpose of measuring a mechanical deformation in the load cell. The load cells are mounted on the container wall such that a pressure decrease in the dosing container due to a quantity of the substance being drawn off results in a mechanical deformation which is measured by the sensor and converted into a precise weight determination of the quantity of substance drawn off. In order to prevent an underpressure occurring in the space due to a quantity of substance being drawn off from the dosing container, the container wall of the known dosing container comprises an opening along which the space is in air-exchanging communication with an ambient air. The space in the dosing container is aerated via the opening when a quantity of the substance is drawn from the dosing container so that no underpressure occurs in the space. An air filter is provided in order to prevent undesired escape from the dosing container of the substance with which the dosing container is filled.

A drawback of this known dosing container is that the air filter can become saturated with dust particles, particularly when a powdery substance is held in the dosing container, whereby the air-permeability thereof deteriorates. The required aeration of the space in the dosing container can hereby be disrupted, whereby it is not possible to preclude a certain underpressure when substance is drawn from the container. Such an underpressure in the container disrupts the measurement values of the load cells so that an accurate dosing of a quantity of substance becomes difficult or impossible.

A dosing container according to the present invention obviates this drawback in that the dosing container comprises further pressure-sensitive aerating means which are able and configured to allow air into the dosing container. The pressure-sensitive aerating means can be configured such that they are activated at a relatively low pressure in the space, for instance lower than atmospheric pressure, and provide for the necessary supply of air to the space in order to increase the pressure, while the space is closed off from the outside air at a desired pressure, for instance atmospheric pressure. In a preferred embodiment hereof, the dosing container according to the present invention is characterized in that the further aerating means comprise a non-return valve in a wall of the dosing container, and particularly in a cover of the dosing container which bounds the space on an upper side. The non-return valve is a particularly practical embodiment of an aerating means with which an underpressure in the space of the dosing container can be prevented in controlled manner.

The present invention further relates to a mixing device for mixing a synthetic starting material with an additive, in particular for instance a granular additive or additive in powder form, comprising a mixing housing with an inlet for allowing the substances into a mixing chamber bounded by the mixing housing and an outlet for discharging the substances from the mixing chamber in mixed form, wherein a rotor body is provided on a rotatable shaft in the mixing chamber and comprises on a side a number of rotor arms extending parallel to the shaft in the direction of an opposite wall of the mixing housing, and wherein the opposite wall of the mixing housing is provided with a number of stator arms extending parallel to the shaft in the direction of the rotor body.

Such a mixing device is known from European patent EP0615781. The mixing device described therein comprises a mixing housing with a mixing chamber for receiving a mixture of two or more substances therein. A rotor body with a number of rotor arms is provided in the mixing chamber, and a number of stator arms are provided which extend from a wall of the mixing housing. Through a rotation of the rotor body the rotor arms move through the mixture as stirring rods and impart a flow path here to the mixture between the inlet and the outlet. The stator arms fixed on the mixing housing function as immobile obstacle in the flow path of the mixture so that different flows are created around them in the mixture which provide for a good mixing of the substances supplied to the mixing housing.

An excellent homogeneous mixing of the substances can hereby be realized in most cases with the known device. In the case of a mixture of substances which tend to display a relatively high degree of clotting or agglomeration, particularly the addition of a mineral in relatively fine powder form, such as for instance calcium carbonate, to a synthetic starting material such as for instance polyvinyl chloride, the known device requires a further improvement.

The present invention has for its object, among others, to provide such a further improved mixing device.

In order to achieve the intended object a mixing device of the type stated in the preamble is characterized according to the present invention in that a mixing hopper is provided having an infeed side for receiving a flow of the substances for mixing and an outfeed side which is in open communication with the inlet of the mixing housing, and wherein a dividing body is provided between the infeed side and outfeed side in order to divide the flow of the substances for mixing into a number of at least substantially equal part-flows. The mixing hopper is applied to enable different substances for mixing to be added to each other and supplied more easily to the inlet of the mixing housing of the mixing device. The dividing body here provides for a premixing of the substances for mixing to a premixture suitable for further processing in the mixing housing to a final mixture with the desired homogeneity.

In a further preferred embodiment a mixing device according to the present invention is characterized in that the mixing hopper is provided between the dividing body and the outfeed side with a rotatable stirring body which is able to rotate through the part-flows with a stirring part in a plane transversely of a flow direction of the substances for mixing. A local coagulation of substances is prevented by stirring through the part-flows with the stirring body, so that the substances continue to flow in the mixing hopper. The stirring body moreover contributes to an improved premixing of the substances so that the premixture is highly suitable for feed into a mixing housing of the mixing device.

In a further preferred embodiment a mixing device according to the present invention is characterized in that the mixing device comprises a dosing container for containing a supply of a substance for mixing and for carrying a dosed quantity of the substance therefrom to the mixing housing, wherein the dosing container is provided with measuring means which are able and configured to measure a weight change in the container, wherein the dosing container comprises an air filter for aerating a content of the dosing container and wherein the dosing container comprises further pressure-sensitive aerating means which are able and configured to allow air into the dosing container. The dosing container is used to contain a supply of one or more of a number of substances for mixing and to enable a quantity required for a mixing process to be drawn therefrom in dosed manner in order to enable this dosed quantity to be provided, optionally via a mixing hopper, to the inlet of the mixing housing.

For a correct dosing of a quantity of the substance the dosing container is provided with measuring means which measure a weight change in the dosing container so that a weight of a quantity of substance drawn off can be determined. In order to prevent an underpressure occurring in the space due to a quantity of substance being drawn off from the dosing container the container wall comprises an opening along which the space is in air-exchanging communication with an ambient air. The space is aerated via the opening when a quantity of the substance is drawn out of the dosing container so that no underpressure occurs in the space. An air filter is provided in order to prevent the undesired escape from the dosing container of a quantity of the substance with which the dosing container is filled.

In a further preferred embodiment a mixing device according to the present invention is characterized in that the further aerating means comprise a non-return valve in a wall of the dosing container. A non-return valve or check valve is a particularly practical embodiment of an aerating means with which an underpressure can be prevented in the space of the dosing container. The non-return valve or check valve is preferably arranged in a cover of the dosing container, which cover bounds a storage space in the dosing container on an upper side.

The present invention further relates to a mixing hopper for application in a mixing device for mixing a synthetic starting material with an additive, in particular for instance a granular additive or additive in powder form, which mixing hopper is open on an infeed side in order to receive a flow of the substances for mixing and leaves an opening on an outfeed side in order to discharge the substances to a mixing housing of the mixing device, and wherein a dividing body is provided between the infeed side and outfeed side in order to divide the flow of the substances for mixing into a number of at least substantially equal part-flows.

Mixing hoppers are usually applied in a mixing device in order to add to each other different substances for mixing to form a premixture which can be carried to a mixing housing of the mixing device so as to be mixed therein to a final mixture with the desired homogeneity. A mixing hopper of the above described type is thus known having an open infeed side on which the mixing hopper can be filled with two or more different substances for mixing and an opening on an outfeed side for discharging the substances as premixture to a mixing housing of the mixing device. Between the infeed side and outfeed side the known mixing hopper has a dividing body which divides the flow of the substances for mixing into a number of at least substantially equal part-flows. The dividing body provides here for a premixing of the separate substances to a premixture suitable for processing in the mixing housing to a final mixture with the desired homogeneity. A drawback of the known mixing hopper is that the dividing body can cause local blockages in the flows, so-called bridge formation. This impedes a proper throughflow of the mixture and, in extreme cases, can even result in complete stagnation of the flow, whereby a mixing process is slowed down. This problem can be considerable, particularly in the case of a mixture of substances with a tendency to clot, such as a mixture of a fine mineral powder and a plastic.

A mixing hopper according to the present invention obviates this drawback in that the mixing hopper has the feature that a rotatable stirring body is provided between the dividing body and the outfeed side which is able to rotate through the part-flows with a stirring part in a plane transversely of a flow direction of the substances for mixing. A local coagulation of substances is prevented by stirring through the part-flows with the stirring body, so that the flow continues to move. The stirring body moreover contributes to an improved premixing of the substances so that the premixture is suitable for feed into a mixing housing of the mixing device.

In a preferred embodiment a mixing hopper according to the present invention is characterized in that a further rotatable stirring body is provided between the infeed side and the dividing body which is able to rotate through the flow with a stirring part in a plane transversely of a flow direction of the substances for mixing.

In a preferred embodiment a mixing device according to the present invention is characterized in that the rotor arms are positioned on an imaginary circular line at a regular distance from each other and follow the imaginary circular line during rotation of the rotor body, and that the stator arms are positioned at a distance from the imaginary circular line wherein a shortest possible distance between a stator arm and a passing rotor arm amounts to a maximum of 10 mm. The invention is based here on the insight that such a narrowing in a flow path of the mixture due to the relatively small distance between the stator arms and rotor arms in the mixing chamber results in local stresses in the mixture, wherein compact pieces such as a relatively coarse agglomerates are pulverized. When there is a greater distance between the stator arms and rotor arms, the mixture encounters too little resistance and the resulting play of forces in the mixture is too limited for a good breakdown of the compact pieces, so that undesired lumps in the final mixed product can therefore occur during a process of mixing a synthetic starting material with an additive.

Although a shortest possible distance between a stator arm and passing rotor arm of a maximum of 10 mm results in breakdown of possible compact pieces in the mixture, in a preferred embodiment a mixing device according to the present invention has the feature that a shortest possible distance between a rotor arm and a most closely positioned stator arm amounts to a minimum of 3 mm, and is preferably between 5 and 8 mm. With a narrowing of less than 3 mm between the rotor arm and stator arm a resistance becomes so great due to friction in the mixture that a rotation of the rotor body is made more difficult during use, requires a heavy drive, or is even made impossible. It has been found that a shortest possible distance between rotor arm and stator arm lying in a range of 5 to 8 mm produces excellent results, wherein no or hardly any clotted parts occur in the final mixture following a mixing process of a synthetic starting material and an additive.

In a further preferred embodiment a mixing device according to the present invention is characterized in that a first set of stator arms positioned on an imaginary circular line at a regular distance from each other and a second set of stator arms positioned on an imaginary circular line at a regular distance from each other is provided in the mixing chamber, wherein the second set of stator arms describes a larger imaginary circle than the first set of stator arms, and that a set of rotor arms positioned on an imaginary circular line at a regular distance from each other is provided at least between the first set and second set of stator arms. Through rotation of the rotor body the rotor arms move during a mixing process in a circular path along stator arms positioned on either side thereof, whereby an excellent homogeneous mixing of the synthetic starting material and the additive is realized.

In a particular embodiment a mixing device according to the present invention has the feature that at least one further set of rotor arms positioned on an imaginary circular line at a regular distance from each other is provided. The resulting mixing by at least two sets of rotor arms is found in practice to be sufficient to obtain the desired homogeneous mixture with a single passage through the mixing housing of the synthetic starting substance and the additive, in particular a granular additive or additive in powder form.

In order to be able to provide in the mixing housing at least two sets of rotor arms positioned on an imaginary circular line at a regular distance from each other and at least two sets of stator arms positioned on an imaginary circular line at a regular distance from each other so that a good mixing of substances can thereby be realized, a mixing device according to the present invention is characterized in a further particular embodiment in that the mixing housing is cylindrical and that the mixing chamber has a circular cross-section with a diameter between 350-500 mm. Such a dimension of the mixing chamber provides sufficient space for the provision of the stator arms and rotor arms with the shortest possible distance between a rotor arm and a most closely positioned stator arm amounting to a minimum of 3 mm and a maximum of 10 mm.

In a further preferred embodiment a mixing device according to the present invention is characterized in that the shaft with the rotor body is coupled to rotation means which are able and configured to rotate the shaft with the rotor body in a first direction and in a second, opposite direction, and characterized in a particular embodiment hereof in that the rotation means are able and configured to change a direction of rotation of the rotor body alternately between the first direction and the second direction at a preset interval.

With prolonged rotation of the rotor body in one direction and particularly when mixing substances which display a high degree of clotting, deposits of substance can accumulate after a time against the arms on the surface of the arms facing in the direction of rotation, which is usually counter to a flow direction of the mixture. Due to the relatively high forces in the mixture these deposits can in the course of time harden against the surface of the arms to form undesired clots or lumps in the mixture, which are difficult or impossible to break down afterward so as to realize a homogeneous mixing of the mixture. By making use of a rotor body which is rotatable in opposite directions a first rotation direction can initially be applied, and an opposite rotation direction can then be applied before hardened deposits form against the rotor arms and/or stator arms. The hardening of deposits against the arms, and thereby clotting in the mixture, is hereby prevented. An adjustment of the direction of rotation of the rotor body can be effected manually, although a more practical solution is to provide the mixing device with programmable control means which control the rotor body and change the direction of rotation of the rotor body at a pre-programmed interval.

In a further preferred embodiment a mixing device according to the present invention has the feature that the rotor body divides the mixing chamber into a primary mixing compartment at the inlet and a secondary mixing compartment at the outlet, and comprises an opening as passage between the primary mixing compartment and the secondary mixing compartment. A relatively long flow path is hereby realized in the mixing chamber, wherein a mixture is carried from the inlet through the primary mixing compartment and then via the passage to the secondary mixing compartment and on to the outlet. Substances received in the mixing chamber are hereby fully mixed to a homogeneous mixture.

For complete control over the mixing process it is desirable here for the opening in the rotor body to be at least substantially at the same position in the mixing chamber during a mixing process, so that the flow path in the mixing chamber does not change during the mixing process. If the opening is not provided in the centre of the rotor body the position thereof relative to the mixing chamber will however change during rotation of the rotor body. In a further preferred embodiment a mixing device according to the present invention therefore has the feature that the rotor body comprises a number of openings positioned regularly on an imaginary circular line and that sealing means are provided which are able and configured to leave clear at least one of the number of openings and to seal the remaining of the number of openings. During rotation of the rotor body one of the openings will rotate continuously to a position at least close to a determined fixed position in the mixing chamber, so that a passage to the secondary mixing compartment is continuously left at this determined fixed position. The remaining of the number of openings which are not located close to the determined fixed position are sealed with the sealing means in order to limit an overall route through the rotor body and thereby prevent too short a residence time of the mixture in the primary mixing compartment.

In a further preferred embodiment a mixing device according to the present invention has the feature that the sealing means comprise a plate-like body which is provided in the mixing chamber and is placeable in front of the remaining of the number of openings so as to seal them. The plate-like body is a practical solution for sealing the remaining number of the openings provided in the rotor body. A design of the plate-like body is such here that it is displaceable relative to the rotor body between a ring of stator arms and an adjacent ring of rotor arms, and thus displaces during a rotation of the rotor body relative thereto in order to seal the remaining of the number of openings.

In a further preferred embodiment a mixing device according to the present invention has the feature that the rotor body comprises a circular disc, a centre of which lies out of line with a centre of a cross-section of the mixing chamber. Such a non-central placing of the rotor disc enhances an inflow of substances into the mixing housing at the inlet, so that an overall mixing process progresses more quickly.

In a further preferred embodiment a mixing device according to the present invention has the feature that the outlet for discharging the substances from the mixing chamber in mixed form comprises a transport mechanism which determines process speed and which is configured such that the transport mechanism for transporting the substances in mixed form from the mixing chamber substantially determines the speed at which substances are supplied to the inlet of the mixing housing. By means of the output speed at which mixed material is moved out of the mixing housing it is also determined how much substance is supplied by means of the dosing container on an infeed side via the mixing housing and through the mixing hopper. This such that the supply is as homogeneous as possible and the residence time of the substances in the mixing device is sufficient to provide a homogeneous mixture.

In a further preferred embodiment a mixing device according to the present invention has the feature that the transport mechanism determining the process speed comprises a dosing screw in dual form which is suspended such that a first dosing screw engages in a second dosing screw such that the substances are transported out of the mixing chamber in mixed form. The output speed can be controlled very precisely by means of such a transport means, while the relative suspension of the first and second dosing screw functionally ensure that possible accumulations of material on the transport means are scraped off each other. A transport mechanism determining process speed is thus created which can be controlled very precisely and which is relatively not susceptible to material accumulating on the transport means.

Figure 2:
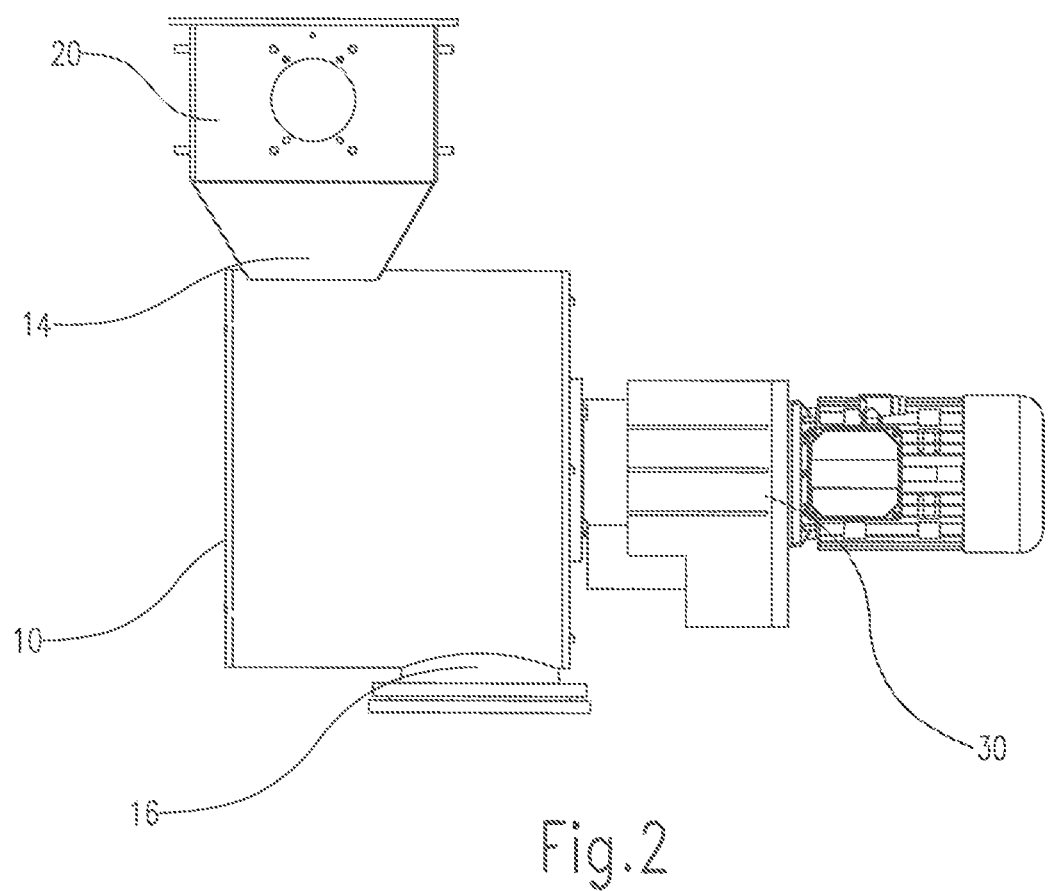

The invention will now be further elucidated on the basis of an exemplary embodiment and an accompanying drawing. In the drawing:

FIG. 1 shows a front view of a mixing device according to the present invention with a mixing housing and a mixing hopper; and FIG. 2 shows a side view of the mixing device according to FIG. 1.

The figures are otherwise purely schematic and not drawn to scale. Some dimensions in particular may be exaggerated to greater or lesser extent for the sake of clarity. Corresponding parts are designated as far as possible in the figures with the same reference numeral.

As shown in FIGS. 1 and 2, mixing device 1 according to the present invention comprises a cylindrical mixing housing 10 which bounds a mixing chamber in which a number of substances can be mixed to a homogeneous mixture. The mixing chamber is divided here into a primary mixing compartment 12 and a secondary mixing compartment 13 by a rotor body 11 in the form of a circular metal disc. Provided in the mixing housing is an inlet 14 along which the substances can be carried into the primary mixing compartment. Provided in rotor body 11 are a number of openings 15 which allow passage from the primary mixing compartment to the secondary mixing compartment. An outlet 16 is provided in the mixing housing in order to discharge the substances mixed to a homogeneous mixture thereto from the mixing housing. The substances to be mixed in the mixing housing thus move during a mixing process from inlet 14 through the primary mixing compartment 12 and through an opening 15 via the secondary mixing compartment 13 to the outlet.

Rotor disc 11 is coupled rotatably to a central drive shaft 17 in the mixing chamber. Via central drive shaft 17 rotor disc 11 can be driven so as to rotate in a first direction as well as in an opposite second direction. Control means which change a direction of rotation of the drive shaft at a preset interval can be coupled to the drive shaft for this purpose.

Provided on the rotor disc are rotor arms 18 which rotate through the mixing chamber during rotation of the rotor disc. On a first side of the rotor disc a number of the rotor arms extend parallel to central drive shaft 17 from the rotor disc in the primary mixing compartment in the direction of a first wall of the mixing housing. In similar manner a number of the rotor arms extend parallel to the central drive shaft 17 from the rotor disc in the secondary mixing compartment in the direction of a second, opposite wall of the mixing housing. In both mixing compartments the rotor arms are provided here as a set of rotor arms which are positioned on an imaginary circular line at a regular distance from each other and which follow the imaginary circular line during a rotation of the rotor disc.

A set of stator arms 19 is also provided on either side of the imaginary circular line in each mixing compartment. The stator arms extend parallel to the rotor arms in the primary mixing compartment from the first wall of the mixing housing, a removable cover, in the direction of the rotor disc. In similar manner stator arms extend parallel to the rotor arms in the secondary mixing compartment from the second wall of the mixing housing in the direction of the rotor disc. Because the stator arms are fixed on the mixing housing, they do not co-displace during a rotation of the rotor disc. The rotor arms thus move along the stator arms in order to realize a mixing of substances received in the mixing housing. The rotor arms and stator arms are placed in the mixing compartments such that a smallest possible distance between a stator arm and rotor arm amounts to a maximum of 10 mm. Such a relatively close distance between a stator arm and passing rotor arm of a maximum of 10 mm results in a breakdown of compact pieces in the mixture, so that the mixing device is particularly suitable for mixing substances which tend to display a relatively high degree of clotting, for instance the addition of a mineral in relatively fine powder form, such as calcium carbonate, to a synthetic starting material such as for instance polyvinyl chloride.

The mixing device further comprises a mixing hopper 20 which is provided on top of the mixing housing and is in open communication with inlet 14 on an outfeed side in order to supply substances to the mixing housing. Opposite the outfeed side the mixing hopper is open on an infeed side so as to be filled there with substances for mixing. Between the infeed side and outfeed side a dividing body is provided in the mixing hopper which divides the flow of the substances for mixing into a number of at least substantially equal part-flows. The dividing body provides for a premixing of the separate substances to a premixture which is suitable for further processing in the mixing housing to a final mixture with the desired homogeneity. Provided between the dividing body and the outfeed side for the purpose of enhancing a proper throughflow of the substances in the mixing hopper is a rotatable stirring body 21 which can rotate through the part-flows in the mixing hopper with a stirring part in a plane transversely of a flow direction of the substances for mixing.

Although the invention has been further elucidated with reference to only a few exemplary embodiments, it will be apparent that the invention is by no means limited thereto. On the contrary, many other variations and embodiments are possible within the scope of the invention for the person with ordinary skill in the art.

The invention claimed is:

1. A dosing container for mixing and carrying a dosed quantity of a substance in granular or powder form to a mixing device, comprising a space bounded by a container wall for containing a supply of said substance in granular or powder form, wherein the dosing container is provided with a set of load cells which are able and configured to measure a weight change in the container, wherein said space is in air-exchanging communication with a surrounding atmosphere via an air filter, wherein said space is provided with pressure sensitive aerating means comprising an opening in said container wall bringing the space in air-exchanging communication with said surrounding atmosphere, and wherein said aerating means controls said opening to allow air into said space of the dosing container when a quantity of the substance is drawn out of the dosing container, thereby preventing an under pressure to occur in said space when said quantity of the substance is drawn out of the dosing container.

2. The dosing container according to claim 1, wherein said pressure sensitive aerating means consists of a non-return valve.

3. The dosing container according to claim 2, further comprising a cover of said container that bounds said space on an upper side wherein said cover comprises a wall.

4. The dosing container according to claim 3, wherein said aerating means comprises a non-return valve that is provided in a wall of the dosing container.

5. A mixing system for mixing a synthetic starting material with a granular additive or additive in powder form, comprising a dosing container, a mixing hopper and a mixing device,
wherein said dosing container comprises a space bounded by a container wall for containing a supply of said starting material, which space is in air-exchanging communication with a surrounding atmosphere via an air filter,
wherein the dosing container is provided with measuring means which are able and configured to measure a weight change in the container,
wherein the dosing container further comprises aerating means which are able and configured to allow air into said space of the dosing container when a quantity of said starting material is drawn out of the dosing container, thereby preventing an under pressure to occur in said space when a said quantity of said starting material is drawn out of the dosing container,
wherein said mixing hopper is open on an infeed side in order to receive a flow of said starting material from said dosing container,
wherein said mixing hopper is open on an outfeed side in order to discharge said starting material to a mixing housing of said mixing device,
wherein a dividing body is provided between the infeed side and outfeed side of the mixing hopper in order to divide the flow of said starting material and said additive into a number of at least substantially equal part-flows,
wherein a rotatable stirring body is provided between the dividing body and the outfeed side of the mixing hopper which is able to rotate through the part-flows with a stirring part in a plane transversely of a flow direction of said starting material,
wherein said mixing housing of said mixing device has an inlet for allowing said starting material and an additive into a mixing chamber bounded by the mixing housing,
wherein said mixing housing of said mixing device has an outlet for discharging the starting material and the additive from the mixing chamber in mixed form,
wherein a rotor body is provided on a rotatable shaft in the mixing chamber, said rotor body comprising on a side a set of rotor arms extending parallel to the shaft in the direction of a facing wall of the mixing housing, and
wherein the facing wall of the mixing housing is provided with a set of stator arms extending parallel to the shaft in the direction of the rotor body.

6. The mixing system according to claim 5, wherein a further rotatable stirring body is provided between the infeed side and the dividing body of the mixing hopper which is able to rotate through the flow with a stirring part in a plane transversely of a flow direction of the starting material.

7. The mixing system according to claim 6, wherein the rotor arms are positioned on an imaginary circle at a regular distance from each other and follow the imaginary circle during rotation of the rotor body, wherein the stator arms are positioned at a distance from the imaginary circle, and wherein a shortest distance between a stator arm and a passing rotor arm is at most 10 mm.

8. The mixing system according to claim 7, wherein said shortest distance is at least 3 mm.

9. The mixing system according to claim 8, wherein said shortest distance is between 5 and 8 mm.

10. The mixing system according to claim 7, wherein a further set of stator arms extends parallel to the shaft in a direction towards the rotor body, said further stator arms being positioned at a regular distance from each other at a second distance from said imaginary circle of said rotor arms, and wherein said imaginary circle that lies between said first set of stator arms and said further set of stator arms.

11. The mixing system according to claim 5, wherein at least one further set of rotor arms is positioned on a further imaginary circle at a regular distance from each other.

12. The mixing system according to claim 5, wherein said rotor body divides the mixing chamber into a primary mixing compartment comprising said inlet and a secondary mixing compartment comprising said outlet, where said rotor body carries a first set of rotor arms that extend into said primary mixing compartment and a second set of rotor arms that extend into said secondary mixing compartment, wherein said primary mixing compartment is provided with a first set of stator arms extending parallel to the shaft in a direction towards the rotor body to engage with said first set of rotor arms, wherein said secondary mixing compartment is provided with a second set of stator arms extending parallel to the shaft in a direction towards the rotor body to engage with said second set of rotor arms, and wherein said rotor body comprises an opening that provides a passage for said mixture between the primary mixing compartment and the secondary mixing compartment.

13. The mixing system according to claim 12, wherein the rotor body comprises a number of openings positioned regularly on an imaginary circular line and that sealing means are provided which are able and configured to expose at least one of said number of openings and to seal the remaining of the number of openings.

14. The mixing system according to claim 13, wherein the sealing means comprise a plate-like body which is provided in the mixing chamber and is placeable in front of the remaining of the number of openings so as to seal them.

15. The mixing system according to claim 12, wherein the rotor body comprises a circular disc, a centre of which lies out of line with a center line of the mixing chamber.

16. The mixing system according to claim 5, wherein the shaft of the rotor body is coupled to rotation means which are able and configured to rotate the shaft in a first direction and in a second, opposite direction, and wherein the rotation means are able and configured to change a direction of rotation of the rotor body alternately between the first direction and the second direction at a pre-set interval.

17. The mixing system according to claim 5, wherein the outlet for discharging the substances from the mixing chamber in mixed form comprises a transport mechanism which determines a process speed of the mixing system such that the transport mechanism substantially determines a speed at which a substance is supplied to the inlet of the mixing housing.

18. The mixing system according to claim 17, wherein said transport mechanism comprises a dual dosing screw, comprising a first dosing screw that engages in a second dosing screw transporting said substance out of the mixing chamber in mixed form.

\* \* \* \* \*